United States Patent [19]

Russell et al.

[11] Patent Number: 4,704,214

[45] Date of Patent: Nov. 3, 1987

[54] DRILLING FLUID

[75] Inventors: Jeffrey A. Russell, Conroe, Tex.; Bharat B. Patel, Bartlesville, Okla.

[73] Assignee: Phillips Petroleum Company, Bartlesville, Okla.

[21] Appl. No.: 659,805

[22] Filed: Oct. 11, 1984

[51] Int. Cl.$^4$ .............................................. C09K 7/02
[52] U.S. Cl. ................................... 252/8.514; 252/8.51
[58] Field of Search ............... 252/8.5 A, 8.5 C, 8.51, 252/8.514

[56] References Cited

U.S. PATENT DOCUMENTS

| | | | |
|---|---|---|---|
| 2,650,197 | 8/1953 | Rahn | 252/8.5 |
| 3,034,982 | 5/1962 | Monroe | 252/8.5 |
| 3,344,063 | 9/1967 | Stratton | 252/8.5 |
| 3,479,287 | 11/1969 | Floyd et al. | 252/8.5 |
| 3,682,821 | 8/1972 | Kolaian | 252/8.5 C |
| 3,700,728 | 10/1972 | Moschopedis et al. | 260/507 R |
| 3,956,140 | 5/1976 | Nahm et al. | 252/8.5 C |
| 3,956,142 | 5/1976 | Wilson et al. | 252/8.5 C |
| 4,220,585 | 9/1980 | Javora et al. | 260/124 R |
| 4,311,600 | 1/1982 | Firth | 252/8.5 |
| 4,404,108 | 9/1983 | Cates | 252/8.5 A |
| 4,420,405 | 12/1983 | McCrary | 252/8.5 A |

OTHER PUBLICATIONS

Frost et al, Article in Journal of Chemical and Engineering Data, vol. 4, No. 2, Apr. 1959, pp. 173–175.

*Primary Examiner*—Herbert B. Guynn
*Attorney, Agent, or Firm*—Paul S. Chirgott

[57] ABSTRACT

In an aqueous drilling fluid, an improved thinning effect is obtained by adding a first agent comprising a mixture of a sulfoalkylated tannin or polyvalent metal complex thereof with a lignite, optionally in combination with a second agent comprising a metal compound of chromium, titanium, iron, zinc, strontium or magnesium which is at least partially soluble in water.

28 Claims, No Drawings

DRILLING FLUID

This invention relates to a drilling fluid, a process in which it is made, and a process in which it is used.

BACKGROUND OF THE INVENTION

In the art of drilling wells the drilling fluid must act as a liquid medium of controlled viscosity for removing cuttings from the bore hole. It should also prevent excessive amounts of fluid from flowing from the bore hole into surrounding formations by depositing on the wall of the hole a thin but substantially impervious filter cake. It desirably possesses a gel structure of sufficient strength to hold solids in suspension, particularly during any time the fluid is not circulating.

The nature of the formation penetrated can change drilling fluid properties. Certain formations, such as gypsum, will effectively "cut" the drilling mud so that the clay particles are flocculated and the viscosity becomes too high. A heaving shale formation absorbs water from the drilling mud and/or swells choking off the circulation of drilling mud. Gelatin and/or thickening of the drilling fluid due to the higher temperatures is sometimes a problem in deeper wells. This tendency to gel or thicken is most pronounced in muds containing water-swelling clays such as bentonite.

OBJECTS OF THE INVENTION

An object of this invention is to provide an improved drilling fluid having enhanced viscosity or other rheological characteristics.

Another object of this invention is to provide improved aqueous drilling fluids which are characterized by stability to the high temperatures encountered in drilling deep wells. Another object of this invention is a method of making a drilling fluid.

Another object of this invention is to provide a method of using said improved drilling fluids in the drilling or workover of wells.

Other aspects, objects, and advantages of the invention will be apparent to those skilled in the art in view of this disclosure.

SUMMARY OF THE INVENTION

We have discovered a new class of additives for drilling fluids. These additives impart improved viscosity or other rheological characteristics, such as "thinning" action, to said drilling fluids.

The additives comprise two or optionally three components. The two-component additive comprises a mixture of sulfoalkylated tannin component and lignite component. The three-component additive additionally contains a component selected from certain water-soluble salts or other materials containing chromium, titanium, iron, zinc, strontium or magnesium.

According to other aspects of the invention, there is provided an aqueous drilling fluid which contains a sulfoalkylated tannin, lignite, and optionally, a water-soluble salt or other material which contains chromium, titanium, iron, zinc, strontium or magnesium.

According to other aspects of the invention, a powdered drilling fluid additive suitable for sacking is formed by mixing lignite with sulfoalkylated tannin, using either wet mixing followed by drying or dry mixing techniques.

Further according to the invention, there are provided methods of using the improved well drilling fluids of the invention, which methods comprise circulating said well drilling fluids into and from the bore hole in contact with the wall of said bore hole.

DETAILED DESCRIPTION OF THE INVENTION

Sulfoalkylated Tannin

Tannins which can be used in preparing the sulfoalkylated tannins and the metal complexes of sulfoalkylated tannins used in the practice of the invention are the vegetable tannins, including both the gallotannins and the flavotannins (sometimes called catechol tannins). Thus, the word "tannin" as used herein and in the claims, unless otherwise specified, includes the vegetable gallotannins and the vegetable flavotannins, The flavotannins, especially quebracho are the presently preferred tannins for use in the invention.

The polyvalent metal complexes of sulfoalkylated tannins can also be used in the invention. Preferred are those which are soluble in the water phase of the drilling fluid. However, metal complexes which can be readily dispersed in the water phase of the drilling fluids can also be used.

Examples of metal compounds which can be used as the complexing metal reagent in the preparation of said metal complexes, include, among others, the water-soluble salts such as the nitrate or chloride, and the hydroxides or hydrated oxides of iron, copper, chromium, nickel, cobalt, magnesium, manganese, zinc, aluminum, titanium, and vanadium. Generally speaking, the water-soluble salts are preferred. However, the hydrated oxides or hydroxides of said metals are sometimes preferred compounds because they contain no anions such as chloride or nitrate which would be left in the reaction mixture when the cation is complexed with the tannin.

The water soluble salts of sulfoalkylated tannin, either a gallotannin or a flavotannin, can be prepared by several different procedures. Usually, sulfoalkylation involves the alkylation of tannin molecules with at least one $—C(R)_2—SO_3M$ side chain wherein each R is selected from the group consisting of hydrogen an alkyl radicals containing from 1 to about 5 carbon atoms, and M is selected from the group consisting of ammonium and the alkali metals. The quantities of reagents can be controlled so that the tannin is only partially sulfoalkylated, or used in amounts and under reaction conditions such that essentially all available sites are sulfoalkylated.

The amount of sulfoalkylation reagent used, in parts by weight per 200 parts by weight of quebracho or other tannin, is sometimes referred to as the "degree of sulfoalkylation". Within operational ranges and stoichiometric limits, the degree of sulfoalkylation can be varied to suit the objectives of the drilling fluid additive under various conditions of use. For example, with quebracho a degree of sulfomethylation (DSM) of 150 produces an effective thinning additive, while a lower DSM will improve water loss control at the expense of thinning effect. Preferably, 1 part by weight of quebracho produces about 1.9 parts by weight of sulfomethylated quebracho (SMQ). A DSM in the range of from about 120 to about 180 produces a sulfoalkylated tannin suitable for all around use as a drilling mud thinner and water loss control agent.

Any suitable lignite or lignite by-product can be used in this invention. The ligites used in this invention are preferably non-sulfoalkylated and have been pre-treated with alkali bases, or "causticized" for improved water solubility. Preferred lignite used in this invention has an oxygen content of at least about 20 weight percent, usually in the range of from about 20 to about 40 weight percent, measured on a dry basis. Lignitic materials which are high in humic acids, thus readily soluble in basic solution, are most preferred. Presently preferred is Leonardite, which is characterized by its high oxygen content and increased alkali solubility. The solubility of Leonardite is greater than that of conventional lignite. As an example, a typical solubility of conventional lignite is about 68 percent in alkali, whereas Leonardite has a solubility of about 85 percent. All proportions herein are by weight. A typical Leonardite having 85 percent solubility consists of 13.5 percent moisture, 71.5 percent humic acids, and 15 percent residue, whereas lignite of 67.7 percent solubility may have an analysis of 15 percent moisture, 51.7 percent humic acid, and 33.3 percent residue. Leonardite is a soft, earthy, medium brown, coal-like substance associated with lignitic outcrops in North Dakota, South Dakota, Montana and Texas, and is mined commercially. Normal lignite may be converted to a material of similar properties by oxidation and such converted lignite may be used in the preparation of the compositions of this invention. Leonardite has an oxygen content higher than that of other types of lignite, generally about 28 percent to 29 percent oxygen as compared to 10 percent to 20 percent oxygen in lignite. The higher oxygen content of leonardite is due to the larger number of carboxylic acid groups, which may explain the great increase in alkali solubility of leonardite as compared to other lignites.

Metal Compound Additives

A metal selected from chromium, titanium, iron, zinc, strontium or magnesium can be used as a component of the invention in a form which is at least partially water-soluble. Materials which can be used as a component of the invention are at least partially water-soluble salts, compounds or other materials which contain chromium, titanium, iron, zinc, strontium or magnesium. In addition, various compounds of tin, nickel and manganese may be used. The simple inorganic salts such as the nitrates, chlorides, iodides, bromides, fluorides, phosphates, sulfates, etc. of said metals are suitable. Various oxides can be used. Also acceptable are the double salts such as sodium chromium(II) sulfate hexahydrate, zinc ammonium chloride, zinc sodium chloride, sodium zinc sulfate hexahydrate, potassium tetrachlorozincate-aluminum sulfate, and alums such as potassium chromium sulfate dodecahydrate. The metal cations can be present in various hydrated or inorganic complex form. Metal anionic forms such as the alkali metal, ammonium, zinc magnesium or iron chromates and dichromates, sodium zincate and others may also be used.

The amphoteric metal chromium forms anionic compounds such as the chromates and dichromates which are preferred materials for use in this invention. Zinc and iron are also amphoteric, but form fewer anionic compounds, of which only sodium zincate and ferrates such as $K_2FeO_4$ are as useful as the chromates and dichromates.

Chromium Compounds

Chromium is generally the preferred metal present in the third component of the invention. In addition to the cationic compounds generally disclosed above, chromium compounds useful in this invention include water soluble oxides and hydroxides, such as chromous hydroxide $Cr(OH)_2$; hydrated chromic oxides, $Cr_2O_3.nH_2O$ and chromic trioxide, $CrO_3$. Oxyhalides such as chromium oxychloride $CrO_2Cl_2$, and hydrated species such as chromium iodate hydrate $[Cr(H_2O)_6] I_3.H_2O)$ can also be used. Compounds of various chromium complexes can be used, such as hexammine chromium-(III) chloride, $Cr(NH_3)_6Cl_3.H_2O$, and compounds of mixed complexes involving combinations of ammine, aquo and acido groups (such as halide, nitro or sulfate ions). Various alums such as $KCr(SO_4)_2.12H_2O$ are also useful.

Zinc Compounds

Any cationic compound of zinc which is at least partially soluble in water can be used as the metal compound for this invention. Most inorganic cationic compounds of zinc can be used, especially the salts of the mineral acids, such as zinc halides, nitrate, carbonate, sulfate, phosphates, etc., and the salts of hypohalous acids and per-acids such as the bromates, chlorates, perchlorates and iodates. Certain hydrated forms of these compounds may be preferred depending upon the solubility characteristics required. Zinc oxide, hydroxide, borate, $3ZnO.2B_2O_3$; permanganate, $Zn(MnO_4)_2.6H_2O$; and fluosilicate, $ZnSiF_6.6H_2O$ can be used. Mixed salts of zinc and magnesium such as $Zn(Mg)SO_4.7H_2O$ and $MgSO_4.ZnSO_4.6H_2O$ can be used, and combine two metals which are useful in this invention. Zinc salts of various organic acids can be used, such as the formate, acetate, acetylacetonate, lactate, salicylate and tartrate. Also, zinc complexes such as zinc formaldehyde-sulfoxylate, $Zn(HSO_2.CH_2O)_2$, can be used.

Anionic compounds of zinc are not common, but the zincate ion, $ZnO_2^{-2}$, obtained by dissolving $Zn(OH)_2$ in excess hydroxide, and solid zincates, such as $K_2ZnO_2$, are useful in this invention.

Iron Compounds

Various inorganic ferrous or ferric compounds which are at least partially soluble in water can be used in this invention, including salts of most mineral acids such as the halides, nitrates, and sulfates. Salts of hypohalous or per-acids such as perchlorates can also be used. Various hydrated or complexed forms such as $FeBr_3.6H_2O$ and $FeCl_2.6NH_3$ can be selected. Various hydroxides or hydrated oxides can be used, as well as the fluosilicates, $FeSiF_6.6H_2O$ and $Fe(SiF_6)_3$. Ferric dichromate is a preferred salt.

Ferrous and ferric salts of organic acids, such as the acetates, citrates, oxalates, lactates and tartrates, can also be used. The thiocyanates, such as $Fe(SCN)_2.3H_2O$ and $Fe(SCN)_3$, and thiosulfates, e.g., $FeS_2O_3.5H_2O$, can also be used.

Mixed salts of iron and the alkali metals, such as oxalates and sulfates, e.g., $K_3Fe(C_2O_4)_3.3H_2O$ and $K_2SO_4.FeSO_4.6H_2O$, can also be used.

Anionic compounds of iron which can be used include ferrates of alkali or alkaline earth metals such as $K_2FeO_4$, $BaFeO_4$ and $SrFeO_4$ and perferrites such as $BaFeO_3$ and $SrFeO_3$.

Magnesium Compounds

Various inorganic magnesium compounds can be used, including the oxides, hydroxide and salts of mineral acids, particularly the halides, nitrates, nitrites, sulfates and sulfites. The bromides, chlorides and iodides are the most soluble of the halides. Salts of the hypohalous and per-acids, such as the chlorates, perchlorates, chromates and permanganates can be used. The fluosilicates, e.g. $MgSiF_6$, and thiosulfate, $MgS_2O_3.6H_2O$, can be used. Also useful are the mixed salts of magnesium with alkali metals, such as the various mixed sulfates.

Magnesium salts of organic acids can be used, such as the formates, acetates, citrates, lactates, tartrates and oxalates.

Strontium Compounds

Strontium compounds useful in this invention are similar to those discussed above for magnesium, including the oxides, hydroxides, halides, nitrates, nitrites, and sulfates. Although the fluoride is essentially insoluble, the fluosilicate is soluble. Salts of the hypohalous and per-acids such as the bromate, chlorate, perchlorate and permanganate can be used. The hydrosulfide, $Sr(HS)_2$, tetrasulfide, $SrS_4.6H_2O$, thiosulfate, $SrS_2O_5.5H_2O$, and dithionate, $SrS_2O_6.4H_2O$, are also useful.

Strontium salts of organic acids which can be used include the formates, acetates, salicylates and lactates.

Proportions and Employment of Combination Additives

The weight proportions of sulfoalkylated tannin to non-sulfoalkylated lignite is generally in the range of from about 1:99 to about 99:1, usually from 10:90 to 90:10 preferably from about 30:70 to about 80:20. In a preferred embodiment, the weight ratio of sulfoalkylated tannin to lignite is in the range of from about 1:1 to about 2:1, based upon successful use in examples.

The amount of metal additive agent when used is generally within the range of from about 100:1 to about 1:1, preferably within the range of from about 70:1 to 2:1 based on weight of sulfoalkylated tannin plus lignite to additive agent. Frequently, a weight ratio within the range of from about 40:1 to 5:1 is more preferred.

The amounts of the 3-component additives of the invention (sulfoalkylated tannin plus lignite plus metal compound) used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased temperatures and/or contamination. While therefore the amount of additive used is not of the essence of the invention, it can be stated that the amount of the 3-component additive used will normally be within the range of about 0.1 to about 30, preferably about 0.5 to about 20 and more preferably about 1 to about 10, pounds per barrel, (42 US gallon) of drilling fluid.

The 3-component additives of this invention are particularly effective in providing thinning action, or reducing at least one of the properties (a) the plastic viscosity (b) the yield point, (c) the shear strength, (d) the water loss due to filtration and (e) the 10-minute gel strength of drilling fluids contaminated with cement, gypsum or salt, and/or utilized at elevated temperatures, as shown by the examples herein.

The inventive composition can be provided in a powdered or flaked form suitable for bagging by first providing dry sulfoalkylated tannin such as from a drum dryer and dry blending in the lignite or adding flaked lignite to a solution of sulfoalkylated tannin and drying the resulting mixture finally in a drum dryer. The metal can be usually added to the solution or to the dry material.

An important advantage of the 2 and 3-component additives of the invention is the ease with which they can be dispersed in the water phase of aqueous drilling fluids. The additives can be incorporated in said drilling fluids by merely adding same to a circulating stream of the drilling fluid. The components of said combination additives are easily pulverized solids which can be added directly as such or dry blended together, to the jet hopper commonly employed in formulating drilling fluids. The incorporation of said combination additives into the drilling fluid can be either before or during the drilling of the well. Dry blending of the first and second additive agents together in a proper weight ratio and then incorporating the resulting dry blend or mixture into a circulating stream of the drilling fluid is a presently preferred method for adding said additives to the drilling fluid. The additive agents can also be dispersed in water separately and the resulting separate dispersions incorporated into the drilling fluid. However, it is pointed out that the first, second and third components should not be dispersed in water together at high concentrations greater than about 50 pounds per barrel prior to incorporating same into the drilling fluid. When said components are dispersed in water together at such high concentrations in the absence of finely divided solids such as clayey materials, a firm insoluble gel sometimes forms. Surprisingly, said gel is not formed when said additive agents are incorporated in the aqueous phase of a drilling fluid containing suspended finely divided solids such as clayey materials.

EXAMPLE I

A mixture of 41.5 mL (37 weight percent HCHO) aqueous formaldehyde, 50 mL of water and 53 g sodium metabisulfite was placed in a closed vessel and stirred for one hour at ambient temperature to give solution No. 1. A mixture of 150 mL of water, 20 mL of 50 weight percent aqueous sodium hydroxide and 100 g quebracho was stirred in an open container for one hour to give solution No. 2. These two solutions were mixed and heated at 205° F. for about one hour while stirring. An additional 20 mL of 50 weight percent aqueous sodium hydroxide was introduced into the reaction mixture along with 100 g lignite (Tannathin ®, South Dakota Leonardite). Sufficient water was added to give a slurry which was stirred and heated at 205° F. for about 30 minutes before drum drying the entire reaction mass to a flaked water-soluble solid. This blend is referred to hereinbelow as a 1.9/1 SMQ (sulfomethylated quebracho)/lignite blend. The quantities of quebracho and lignite used to prepare various blends by the slurry method are summarized in Table I.

TABLE I

SMQ/Lignite Blends Prepared by the Slurry Process

| | Reactants Charged | | Blend Compositions | |
|---|---|---|---|---|
| Run No. | Quebracho | Lignite | Wt. SMQ/ Wt. Lignite | Wt. % SMQ/ Wt. % Lignite |
| 1 | 100 g. | 100 g. | 1.9/1 | 65.5/34.5 |
| 2 | 100 g. | 200 g. | 1.9/2 | 48.7/51.3 |
| 3 | 100 g. | 300 g. | 1.9/3 | 38.8/61.2 |

TABLE I-continued

SMQ/Lignite Blends Prepared by the Slurry Process

| Run No. | Reactants Charged Quebracho | Lignite | Blend Compositions Wt. SMQ/ Wt. Lignite | Wt. % SMQ/ Wt. % Lignite |
|---|---|---|---|---|
| 4* | 100 g. | 190 g. | 1/1 | 50/50 |

*This entry is included to indicate the quantities which would be used in the slurry process to prepare a 50/50 wt/wt SMQ/lignite blend. This composition was not actually prepared by the slurry process procedure.

General Test Procedures

The following procedures were used to test the effectiveness of the SMQ/lignite blends with and without added metal compounds as thinners for drilling muds.

For the uncontaminated fresh water mud tests, the thinners were added to 280 mL aliquots of base mud and stirred for 20 minutes on a multimixer. The pH of weighted fresh water mud samples was adjusted to about 10.5 by the addition of aqueous sodium hydroxide solution while the samples were stirred on the multimixer. The samples were cooled to room temperature, stirred two minutes and tested. After initial testing, the samples were aged 16 hours at 80° C. (176° F.) and then tested again at room temperature. Selected samples were aged 16 hours at 149° C. (300° F.) in brass bombs and then tested at room temperature.

For the contaminated mud tests, the thinners were added to 840 mL aliquots of base mud. The pH was adjusted as above to about 10.5 and then the samples were aged 16 hours at 80° C. After the aged mixtures were cooled and stirred two minutes, they were divided into three samples. One sample was tested as an uncontaminated mud and discarded; a second sample was contaminated with 2 lb/bbl NaCl; and the third sample was contaminated with 2 lb/bbl gypsum. The contaminated samples were stirred 20 minutes and then aged for 16 hours at 80° C. The cooled samples were stirred for two minutes and tested. Selected samples were then aged 16 hours at 149° C. and tested as above.

The test procedures in the unweighted fresh water mud, synthetic sea water mud and field mud systems were similar except the pH was not adjusted.

EXAMPLE II

This example presents results in Table II which illustrate the performance of SMQ/lignite blends (Runs 1, 2 and 3) in thinning uncontaminated and contaminated drilling muds.

TABLE II

SMQ/Lignite Blends* in Contaminated and Uncontaminated Muds

| Run. No | Uncontaminated Mud PV/YP$^d$ | Uncontaminated Mud Gels$^e$ | NaCl$^c$ Contaminated Mud PV/YP$^d$ | NaCl$^c$ Contaminated Mud Gels$^e$ | NaCl$^c$ Contaminated Mud Water Loss$^j$ | Gypsum$^c$ Contaminated Mud PV/YP$^d$ | Gypsum$^c$ Contaminated Mud Gels$^e$ |
|---|---|---|---|---|---|---|---|
| Base Mud$^a$ | 31/25 | 5/43 | TTTM$^f$ | TTTM$^f$ | NR** | TTTM$^f$ | TTTM$^f$ |
| Control$^b$ | 29/5 | 1/2 | 31/47 | 25/84 | 7.5 | 34/57 | 48/65 |
| 1$^g$ | 29/7 | 0/1 | 34/53 | 27/81 | 6.8 | 33/67 | 58/78 |
| 2$^h$ | 34/6 | 0/1 | 37/58 | 48/97 | 6.3 | 38/78 | 67/81 |
| 3$^i$ | 30/8 | 1/2 | 38/51 | 53/101 | 6.4 | 36/86 | 73/82 |

*Thinner blend was used at a level of 4 lb/bbl.
**NR represents "Not Recorded".
$^a$Base mud was weighted fresh water mud prepared by mixing 3947 g P95 clay, 789 g bentonite and 9452 g barite in 16813 mL of deionized water.
$^b$The control was SMQ used at a level of 4 lb/bbl.
$^c$NaCl contaminated mud and gypsum contaminated mud were prepared, respectively, by adding 2 lb/bbl NaCl and 2 lb/bbl CaSO$_4$.2H$_2$O to the uncontaminated mud.
$^d$PV represents Plastic Viscosity in centipoise; YP represents Yield Point in lb/100 ft$^2$.
$^e$Gels represents gel strengths in lb/100 ft$^2$, 10 sec. and 10 min.
$^f$TTTM represents "Too Thick To Measure".
$^g$The 1.9/1 weight/weight blend of SMQ/lignite was used.
$^h$The 1.9/2 weight/weight blend of SMQ/lignite was used.
$^i$The 1.9/3 weight/weight blend of SMQ/lignite was used.
$^j$Water loss measured in mL/30 minutes.

Referring to the uncontaminated mud results in Table II, it is evident that the various SMQ/lignite blends (runs 1,2,3) were comparable in performance to the SMQ control (yield points and 10 minute gel strengths are approximately equal).

Referring to the contaminated mud results in Table II, it is evident that the 1.9/1 SMQ/lignite blend (Run 1) was superior to the 1.9/2 and 1.9/3 SMQ/lignite blends (Runs 2 and 3) as reflected by lower yield points and lower 10 minute gel strengths. In general, lower yield points and lower gel strengths attest to the effectiveness of an additive as a mud thinner. The 1.9/1 SMQ/lignite (Run 1) was comparable to the SMQ control in these contaminated mud systems.

Referring to the NaCl contaminated mud results in Table II, it is noteworthy that all three SMQ/lignite blends controlled water loss better than did the SMQ control run.

EXAMPLE III

This example presents results in Table III which demonstrate the thinning capacity of the three SMQ/lignite blends containing Na$_2$Cr$_2$O$_7$.2H$_2$O. These compositions were prepared, respectively by mixing 7 parts by weight of the 1.9/1, 1.9/2 and 1.9/3 SMQ/lignite blends with 1 part by weight of Na$_2$Cr$_2$O$_7$.2H$_2$O (Runs 1,2,3). The control thinner was Desco® which is a 7:1 weight/weight blend of SMQ and Na$_2$Cr$_2$O$_7$.2H$_2$O.

TABLE III

Mud Thinners* Containing SMQ/Lignite Blends and $Na_2Cr_2O_7 \cdot 2H_2O$

| Run. No | Uncontaminated Mud | | NaCl[c] Contaminated Mud | | Water Loss[j] | Gypsum[c] Contaminated Mud | |
|---|---|---|---|---|---|---|---|
| | PV/YP[d] | Gels[e] | PV/YP[d] | Gels[e] | | PV/YP[d] | Gels[e] |
| Base Mud[a] | 31/25 | 5/43 | TTTM[f] | TTTM[f] | NR** | TTTM[f] | TTTM[f] |
| Control[b] | 30/2 | 2/2 | 32/11 | 2/9 | 5.7 | 42/13 | 3/9 |
| 1[g] | 33/6 | 3/4 | 40/17 | 2/15 | 5.8 | 58/28 | 6/24 |
| 2[h] | 36/7 | 3/4 | 47/24 | 2/25 | 5.6 | 72/53 | 16/73 |
| 3[i] | 36/8 | 2/3 | 49/33 | 6/46 | 5.7 | 67/67 | 45/125 |

*Thinners were used at a level of 4 lb/bbl.
**NR represents "Not Recorded".
[a]See footnote a in Table II.
[b]The control was SMQ/$Na_2Cr_2O_7 \cdot 2H_2O$ (7:1 weight/weight; Desco ®).
[c]See footnote c in Table II.
[d]See footnote d in Table II.
[e]See footnote e in Table II.
[f]See footnote f in Table II.
[g]This mixture contained 7 parts by weight of the 1.9/1 SMQ/lignite blend and 1 part by weight of $N_2Cr_2O_7 \cdot 2H_2O$.
[h]This mixture contained 7 parts by weight of the 1.9/2 SMQ/lignite blend and 1 part by weight of $Na_2Cr_2O_7 \cdot 2H_2O$.
[i]This mixture contained 7 parts by weight of the 1.9/3 SMQ/lignite blend and 1 part by weight of $Na_2Cr_2O_7 \cdot 2H_2O$.
[j]See footnote j in Table II.

Referring to the contaminated mud results in Table III it is apparent that the 1.9/1 SMQ lignite blend with added sodium dichromate (run 1) was more effective than the 1.9/2 (run 2) and 1.9/3 (run 3) blends of SMQ/lignite with added sodium dichromate. The three blends were comparable in the uncontaminated mud tests. These conclusions are based on the relative yield point and 10 minute gel strength values (lower values correspond to better thinning capacity of the additive). The Desco ® control system was only slightly better than the analogous 1.9/1 SMQ/lignite blend system in each of the mud systems. Water loss control in the NaCl contaminated mud was approximately the same for all of the thinners in Table III.

EXAMPLE IV

This example presents data in Table IV on a fresh water mud which establish the optimum range of $Na_2Cr_2O_7 \cdot 2H_2O$ to be used with the 1.9/1 SMQ/lignite blend. Results on several SMQ/$Na_2Cr_2O_7 \cdot 2H_2O$ compositions are included in Table IV to reflect the thinning capacity of these non-lignite-containing systems. Desco ®, for example, is a 7:1 weight/weight mixture of SMQ and $Na_2Cr_2O_7 \cdot 2H_2O$ corresponding approximately to 87.5 weight percent SMQ and 12.5 weight percent sodium dichromate dihydrate. Results are summarized in Table IV at a thinner level of 1 lb/bbl in an uncontaminated mud.

TABLE IV

Mud Thinners Containing Different Amounts of $Na_2Cr_2O_7 \cdot 2H_2O$ In Fresh Water Mud*

| Run No. | Additive | Weight Percent DiCr[a] | Unaged Results | | Aged 16 Hours @ 80° C. | |
|---|---|---|---|---|---|---|
| | | | PV/YP | Gels | PV/YP | Gels |
| 1 | Base Mud* | 0 | 27/41 | 48/96 | 37/26 | 8/40 |
| 2 | SMQ | 0 | 27/11 | 2/20 | 33/12 | 1/2 |
| 3 | SMQ/DiCr | 5 | 27/10 | 1/17 | 33/12 | 1/1 |
| 4 | SMQ/DiCr | 10 | 30/8 | 2/21 | 36/12 | 1/1 |
| 5 | SMQ/DiCr | 12.5 | 27/8 | 1/16 | 35/8 | 1/2 |
| 6 | SMQ/DiCr | 15 | 28/11 | 2/21 | 35/12 | 2/2 |
| 7 | SMQ/DiCr | 20 | 27/12 | 3/25 | 33/12 | 3/4 |
| 8 | B[b] | 0 | 27/13 | 2/22 | 34/12 | 2/3 |
| 9 | B[b]/DiCr | 5 | 29/8 | 1/14 | 39/7 | 1/1 |
| 10 | B[b]/DiCr | 10 | 29/13 | 2/28 | 37/11 | 2/3 |
| 11 | B[b]/DiCr | 12.5 | 30/9 | 1/16 | 37/8 | 1/2 |
| 12 | B[b]/DiCr | 15 | 29/14 | 2/22 | 36/12 | 2/3 |
| 13 | B[b]/DiCr | 20 | 28/14 | 3/30 | 35/12 | 3/4 |

[a]DiCr represents $Na_2Cr_2O_7 \cdot 2H_2O$.
[b]B represents the 1.9/1 SMQ/lignite blend.
*See footnote a in Table II (weighted fresh water mud).

Referring to the results in Table IV, it is evident that 5 to 12.5 weight percent $Na_2Cr_2O_7 \cdot 2H_2O$ loadings in SMQ or SMQ/lignite blend yield effective thinners as shown by the relatively low yield points and 10 minute gel strength. The Desco ® system (87.5 weight percent SMQ and 12.5 weight percent $N_2Cr_2O_7 \cdot 2H_2O$) was comparable in thinning performance to the 12.5 weight percent $Na_2Cr_2O_7 \cdot 2H_2O$/87.5 weight percent 1.9/1 SMQ/lignite blend system (see runs 5 and 11).

EXAMPLE V

This example presents data in Table V on contaminated muds which estabish the optimum range of $Na_2Cr_2O_7 \cdot 2H_2O$ to be used with the 1.9/1 SMQ/lignite blend. Results on several SMQ/$Na_2Cr_2O_7 \cdot 2H_2O$ compositions are included in Table V to reflect the thinning capacity of these non-lignite-containing systems. Results are summarized in Table V at a thinner level of 4 lb/bbl. Contaminated muds contained 2 lb/bbl/NaCl or 2 lb/bbl gypsum, $CaSO_4 \cdot 2H_2O$, and samples were aged 16 hours at 80° C.

TABLE V

Mud Thinners Containing Different Amounts of $Na_2Cr_2O_7 \cdot 2H_2O$ in Thermally Aged Contaminated Muds (Aged 16 Hours @ 80° C.)

| Run No | Additive | Weight Percent DiCr[a] | NaCl* Contaminated Muds | | Gypsum* Contaminated Muds | |
|---|---|---|---|---|---|---|
| | | | PV/YP | Gels | PV/YP | Gels |
| 1 | SMQ | 0 | 29/93 | 43/89 | 26/72 | 49/64 |
| 2 | SMQ/DiCr | 5 | 38/39 | 11/58 | 34/59 | 29/70 |
| 3 | SMQ/DiCr | 7.5 | 42/20 | 4/29 | 47/34 | 12/50 |
| 4 | SMQ/DiCr | 10 | 40/11 | 2/14 | 43/27 | 5/36 |
| 5 | SMQ/DiCr | 15 | 42/12 | 2/7 | 55/20 | 3/14 |
| 6 | B[b] | 0 | 30/86 | 40/80 | 28/81 | 55/73 |

TABLE V-continued

Mud Thinners Containing Different Amounts of $Na_2Cr_2O_7.2H_2O$ in Thermally Aged Contaminated Muds (Aged 16 Hours @ 80° C.)

| Run No | Additive | Weight Percent DiCr[a] | NaCl* Contaminated Muds PV/YP | Gels | Gypsum* Contaminated Muds PV/YP | Gels |
|---|---|---|---|---|---|---|
| 7 | B[b]/DiCr | 5 | 39/44 | 13/69 | 37/62 | 30/83 |
| 8 | B[b]/DiCr | 7.5 | 45/30 | 4/40 | 50/49 | 15/68 |
| 9 | B[b]/DiCr | 10 | 45/18 | 2/14 | 62/42 | 7/41 |
| 10 | B[b]/DiCr | 15 | 51/20 | 3/13 | 86/56 | 14/56 |

*See footnote c in Table II.
[a]See footnote a in Table IV.
[b]See footnote b in Table IV.

Referring to the results in Table V, it is evident that the SMQ/$Na_2Cr_2O_7.2H_2O$ system containing 15 weight percent sodium dichromate dihydrate gave the lowest yield points and 10 minute gel strengths of the SMQ/dichromate systems in contaminated muds after aging 16 hours at 80° C. (run 5). The most effective inventive system was the SMQ/lignite/dichromate system consisting of 90 weight percent of the 1.9/1 SMQ/lignite blend and 10 weight percent $Na_2Cr_2O_7.2H_2O$ (Run 9). Attention is called to the relatively low values of yield point and 10 minute gel strengths in run 9.

After the thermal aging at 80° C. of the samples in Table V containing, respectively, 7.5; 10; and 15 weight percent $Na_2Cr_2O_7.2H_2O$, these samples were further aged for 16 hours at 149° C. and then reexamined. The results are summarized in Table VI.

For example, the SMQ/lignite/dichromate system consisting of 85 weight percent of the 1.9/1 SMQ/lignite blend and 15 weight percent $Na_2Cr_2O_7.2H_2O$ would be a more effective thinner at high temperature than would be the analogous SMQ/dichromate system containing 85 weight percent SMQ and 15 weight percent $Na_2Cr_2O_7.2H_2O$. The water loss control in the various runs summarized in Table VI was about the same.

EXAMPLE VI

This example describes the slurry preparation and testing of 1.9/1 SMQ/lignite blends formulated with magnesium oxide or zinc oxide. The tests were carried out in an unweighted fresh water mud. In the preparative slurry process, the metal compounds were added with the lignite and NaOH to the sulfomethylated quebracho solution.

In a representative procedure, 53 g of sodium metabisulfite, 41.5 mL of aqueous formaldehyde (37 weight percent HCHO) and 50 mL of water were stirred at ambient temperature in a closed container for one hour. In a separate beaker, 100 g of quebracho, 150 mL of water and 20 mL of 50 weight percent aqueous NaOH were heated to 200° F. to completely solubilize the quebracho. The above solutions were mixed and heated at about 205° F. for one hour while stirring to effect the sulfomethylation of the quebracho. To this solution of sulfomethylated quebracho (SMQ), 100 g of lignite, 30 mL of 50 weight percent aqueous NaOH, a metal compound and the necessary amount of water for a slurry

TABLE VI

Mud Thinners Containing Different Amounts of $Na_2Cr_2O_7.2H_2O$ in Thermally Aged Contaminated Muds (Aged 16 hours @ 149° C.)

| Run No | Additive | Weight Percent DiCr[a] | NaCl* Contaminated Mud PV/YP | Gels | Water# Loss | Gypsum[c] Contaminated Mud PV/YP | Gels | Water# Loss |
|---|---|---|---|---|---|---|---|---|
| 1 | SMQ/DiCr | 7.5 | 36/42 | 10/62 | 7.0 | 31/38 | 24/62 | 9.3 |
| 2 | SMQ/DiCr | 10 | 34/36 | 5/53 | 6.4 | 30/32 | 16/56 | 8.5 |
| 3 | SMQ/DiCr | 15 | 40/29 | 4/34 | 6.9 | 29/20 | 4/29 | 7.7 |
| 4 | B[b]/DiCr | 7.5 | 45/25 | 5/54 | 6.5 | 32/38 | 21/68 | 8.1 |
| 5 | B[b]/DiCr | 10 | 41/21 | 3/38 | 6.6 | 33/28 | 9/49 | 7.3 |
| 6 | B[b]/DiCr | 15 | 40/12 | 2/10 | 6.6 | 37/20 | 3/27 | 7.4 |

Water Loss in mL/30 minutes
[a]See footnote a in Table IV.
[b]See footnote b in Table IV.
[c]See footnote c in Table II.

Referring to the results in Table VI, it is evident that the yield points and gel strengths with the inventive systems (Runs 4, 5 and 6) were generally lower than the yield points and gel strengths in control runs 1, 2 and 3.

was added. This mixture was thermally digested for about 30 minutes and then drum-dried to a water-soluble flaked solid. The following compositions were prepared (see Table VII), and tested (see Table VIII).

TABLE VII

Mud Thinners Containing 1.9/1 SMQ/Lignite Blend with Added MgO or ZnO

| Run No. | Weight of Metal Cpd. (g) | Weight of Quebracho (g) | Weight of Lignite (g) | Thinner Composition (Wt. %)* SMQ | Lignite | Metal Cpd. |
|---|---|---|---|---|---|---|
| 1 | MgO (30) | 100 | 100 | 59.4 | 31.2 | 9.4 |
| 2 | ZnO (30) | 100 | 100 | 59.4 | 31.2 | 9.4 |
| 3 | ZnO (38) | 100 | 100 | 57.9 | 30.5 | 11.6 |
| 4 | ZnO (44) | 100 | 100 | 56.9 | 29.9 | 13.2 |

*Weight percent is based on weight of SMQ produced, lignite and metal compound. One part quebracho yields 1.9 parts SMQ.

TABLE VIII

Thinners Containing 1.9/1 SMQ/Lignite Blend With MgO and ZnO in Uncontaminated Mud[c]

| Run No | Additive* | Weight Percent Metal Compound | Unaged Results PV/YP | Unaged Results Gels | Aged 16 Hrs @ 80° C. PV/YP | Aged 16 Hrs @ 80° C. Gels | # Water Loss |
|---|---|---|---|---|---|---|---|
| 1 | Base Mud[c] | 0 | 21/24 | 7/44 | 25/32 | 15/57 | 6.7 |
| 2 | SMQ | 0 | 25/25 | 17/54 | 26/27 | 14/51 | 7.1 |
| 3 | B[b]/DiCr[a] | 12.5 | 21/27 | 19/53 | 27/22 | 3/17 | 6.6 |
| 4 | B[b]/MgO | 9.4 | 23/24 | 19/58 | 24/26 | 18/50 | 7.0 |
| 5 | B[b]/ZnO | 9.4 | 23/23 | 8/52 | 24/25 | 13/41 | 5.8 |
| 6 | B[b]/ZnO | 11.6 | 22/21 | 10/49 | 24/28 | 15/46 | 6.7 |
| 7 | B[b]/ZnO | 13.2 | 22/25 | 13/55 | 23/27 | 16/47 | 6.4 |

*Thinner level was 1 lb/bbl.
Water Loss in mL/30 minutes.
[a]DiCr represents $Na_2Cr_2O_7 \cdot 2H_2O$.
[b]B represents a 1.9/1 weight/weight blend of SMQ/lignite.
[c]The fresh water unweighted mud was prepared by mixing 3947 g P95 clay and 789 g bentonite in 16813 mL deionized water.

Referring to the yield points and 10 minute gel strengths of the ZnO and MgO systems (unaged samples: runs 4, 5, 6, 7), it is evident that these systems are comparable to the SMQ and SMQ/lignite/dichromate systems of runs 2 and 3. After aging, the SMQ and SMQ/lignite/dichromate systems (runs 2 and 3) were slightly more effective than the ZnO and MgO systems (runs 4–7). Comparable water loss control was exhibited by all of the systems summarized in Table VIII.

EXAMPLE VII

This example describes the testing of the 1.9/1 SMQ/lignite system dry-blended with magnesium oxide or zinc oxide. The tests were carried out at a thinner level of 3 lb/bbl in an unweighted mud contaminated with 2 lb/bbl NaCl. Results are summarized in Table IX.

Referring to the data in Table IX, it is evident (runs 5, 6, 7) that the SMQ/lignite/zinc oxide systems were more efficient thinning agents in the NaCl contaminated mud than were the SMQ system (run 2) or the 1.9/1 SMQ/lignite DiCr system (run 3) as shown by the lower yield points and 10 minute gel strengths, particularly after thermal aging for 16 hours at 80° C. The failure of the base mud was dramatic after thermal aging; the samples became so thick that yield points and gel strengths could not be determined.

EXAMPLE VIII

This example presents data on thinning additives containing iron, magnesium, zinc and titanium compounds. These were formulated by mixing the various compounds with SMQ or with a 1.9/1 SMQ/lignite blend. Results are summarized in Table X.

TABLE IX

Thinners Containing 1.9/1 SMQ/Lignite Blend with MgO and ZnO in Contaminated Mud[c]

| Run No. | Additive | Weight Percent Metal Compound | Unaged Results PV/YP | Unaged Results Gels | Aged 16 Hrs @ 80° C. PV/YP | Aged 16 Hrs @ 80° C. Gels |
|---|---|---|---|---|---|---|
| 1 | Base Mud[c] | 0 | 25/32 | 15/57 | TTTM* | TTTM* |
| 2 | SMQ | 0 | 20/38 | 36/55 | 28/110 | 80/97 |
| 3 | B[b]/DiCr[a] | 12.5 | 25/23 | 6/43 | 69/112 | 48/104 |
| 4 | B[b]/MgO | 9.4 | 24/28 | 19/65 | 28/100 | 77/88 |
| 5 | B[b]/ZnO | 9.4 | 25/26 | 9/57 | 24/53 | 51/88 |
| 6 | B[b]/ZnO | 11.6 | 23/23 | 8/56 | 25/54 | 57/91 |
| 7 | B[b]/ZnO | 13.2 | 20/23 | 7/52 | 25/46 | 50/90 |

*TTTM represents "too thick to measure".
[a]See footnote a in Table VIII.
[b]See footnote b in Table VIII.
[c]See footnote c of Table VIII for preparation of fresh water unweighted mud which was contaminated in this example with 2 lb/bbl NaCl.

TABLE X

Replacement of Dichromate With Iron, Magnesium, Zinc and Titanium Compounds in Aged Drilling Muds (Aged 16 Hours @ 80° C.)

| Run No. | Additive (Wt. %) | Uncontaminated Mud PV/YP | Uncontaminated Mud Gels | Uncontaminated Mud Water Loss | NaCl Contaminated Mud PV/YP | NaCl Contaminated Mud Gels | NaCl Contaminated Mud Water Loss | Gypsum Contaminated Mud PV/YP | Gypsum Contaminated Mud Gels | Gypsum Contaminated Mud Water Loss |
|---|---|---|---|---|---|---|---|---|---|---|
| 1 | Base Mud* (Control) | 31/25 | 5/43 | 7.0 | TTTM | TTTM | | TTTM | TTTM | |
| 2 | SMQ (Control) | 28/15 | 4/20 | 6.0 | 27/88 | 45/86 | | 29/68 | 40/65 | |
| 3 | 1.9/1 SMQ/Lignite | 30/10 | 2/18 | 6.0 | 35/96 | 63/90 | | 36/81 | 61/76 | |
| 4 | SMQ/DiCr | 35/4 | 1/2 | 5.5 | 42/11 | 2/7 | 5.8 | 42/12 | 1/4 | 6.2 |

TABLE X-continued
Replacement of Dichromate With Iron, Magnesium, Zinc and Titanium Compounds in Aged Drilling Muds
(Aged 16 Hours @ 80° C.)

| Run No. | Additive (Wt. %) | Uncontaminated Mud | | | NaCl Contaminated Mud | | | Gypsum Contaminated Mud | | |
|---|---|---|---|---|---|---|---|---|---|---|
| | | PV/YP | Gels | Water Loss | PV/YP | Gels | Water Loss | PV/YP | Gels | Water Loss |
| | (12.5) SMQ/ FeSO$_4$.7H$_2$O | | | | | | | | | |
| 5 | (15) | 27/4 | 0/1 | 6.4 | 28/56 | 27/84 | | 22/46 | 38/73 | |
| 6 | (25) | 24/3 | 0/0 | 5.9 | 31/25 | 9/56 | | 23/29 | 24/56 | |
| | SMQ/MgO | | | | | | | | | |
| 7 | (15) | 32/8 | 2/6 | | 32/31 | 19/71 | | 26/42 | 33/70 | |
| | 1.9/1 SMQ/ Lignite DiCr | | | | | | | | | |
| 8 | (12.5) | 34/9 | 2/3 | 4.9 | 53/10 | 2/11 | 5.4 | 54/26 | 3/14 | 4.4 |
| | FeSO$_4$.7H$_2$O | | | | | | | | | |
| 9 | (15) | 29/4 | 1/2 | 6.2 | 31/53 | 28/93 | | 27/43 | 39/81 | |
| 10 | (25) | 26/4 | 1/1 | 5.5 | 35/27 | 7/58 | | 27/25 | 22/63 | |
| | MgO | | | | | | | | | |
| 11 | (15) | 35/10 | 2/8 | | 36/37 | 22/84 | | 37/46 | 47/95 | |
| | ZnO | | | | | | | | | |
| 12 | (10) | 36/6 | 2/3 | | 34/31 | 10/74 | 5.6 | 34/43 | 29/87 | 6.4 |
| 13 | (15) | 33/8 | 1/3 | | 35/18 | 3/40 | 5.8 | 33/28 | 13/75 | 6.6 |
| 14 | (20) | 32/7 | 1/2 | | 35/15 | 3/32 | 5.4 | 37/24 | 10/71 | 6.4 |
| | ZnCO$_3$ | | | | | | | | | |
| 15 | (10) | 34/8 | 2/5 | | 37/30 | 19/80 | 5.1 | 38/46 | 41/95 | 5.2 |
| 16 | (15) | 34/11 | 2/5 | | 34/30 | 7/75 | 5.6 | 36/41 | 27/83 | 5.3 |
| | TiO$_2$ | | | | | | | | | |
| 17 | (15) | 33/10 | 2/8 | | 34/53 | 39/94 | | 32/70 | 61/91 | |
| | Fe$_2$O$_3$ | | | | | | | | | |
| 18 | (15) | 32/10 | 2/8 | | 34/55 | 40/90 | | 33/79 | 49/74 | |

*This is a weighted fresh water mud prepared by mixing 3947 g P95 clay, 789 g bentonite and 9452 g barite in 16813 mL of deionized water.

Referring to the results in Table X, it is evident that all of the systems in the uncontaminated mud were comparable in thinning capacity to the Desco ® system, i.e., SMQ (87.5 percent)/DiCr (12.5 percent). Thus, in uncontaminated mud, the following systems were good thinning formulations:

SMQ formulated with MgO (15%) (run 7) or FeSO$_4$.7H$_2$O (15%) (run 5), and 1.9/1 SMQ/lignite formulated with FeSO$_4$.7H$_2$O (15% and 25%) (runs 9 and 10), MgO (15%) (run 11), ZnO (10%, 15%, and 20%), (runs 12, 13, 14), ZnCO$_3$ (10% and 15%) (runs 15, 16), TiO$_2$ (15%) (run 17), and Fe$_2$O$_3$ (15%) (run 18).

In the contaminated mud systems, the Desco ® system, i.e., SMQ (87.5 percent)/DiCr (12.5 percent) (run 4) was generally superior to all the other systems in the Table. The best of the remaining systems was the 1.9/1 SMQ/lignite formulation with 12.5 percent DiCr (run 8) followed by the analogous ZnO system (runs 12–14) each of which provided substantial thinning effects when compared with SMQ alone (run 2) as an additive. The water loss values recorded were comparable for all the blends containing SMQ, lignite and metal compound, in either contaminated or uncontaminated muds.

EXAMPLE IX

This example presents data on selected systems from the foregoing table which had been aged 14 hours @ 149° C. Results are summarized in Table XI.

TABLE XI
Replacement of Dichromate With Iron, Magnesium and Zinc Compounds in Aged Drilling Muds
(Aged 16 Hours @ 149° C.)

| Run No. | Wt. % Metal Compound | Blend | NaCl Contaminated Mud | | Gypsum Contaminated Mud | |
|---|---|---|---|---|---|---|
| | | | PV/YP | Gels | PV/YP | Gels |
| 1 | 0 | SMQ (Alone) | 23/79 | 39/93 | 19/61 | 42/57 |
| 2 | 12.5 | SMQ/DiCr | 42/16 | 3/19 | 33/18 | 3/33 |
| 3 | 0 | 1.9/1 SMQ/ Lignite | 37/64 | 44/99 | 31/58 | 47/73 |
| 4 | 12.5 | 1.9/1 SMQ/ Lignite/ DiCr | 45/19 | 2/41 | 44/17 | 3/32 |
| | | 1.9/1 SMQ/ Lignite/ ZnO | | | | |
| 5 | 10 | | 43/48 | 23/106 | 23/41 | 33/81 |
| 6 | 15 | | 37/54 | 28/114 | 25/49 | 44/89 |
| 7 | 20 | | 37/61 | 32/117 | 27/49 | 47/93 |
| 8 | 15 | MgO | 41/53 | 51/101 | 29/56 | 56/70 |

TABLE XI-continued

Replacement of Dichromate With Iron, Magnesium and Zinc Compounds in Aged Drilling Muds
(Aged 16 Hours @ 149° C.)

| Run No. | Wt. % Metal Compound | Blend | NaCl Contaminated Mud | | Gypsum Contaminated Mud | |
|---|---|---|---|---|---|---|
| | | | PV/YP | Gels | PV/YP | Gels |
| 9 | 25 | FeSO$_4$.7H$_2$O | 35/66 | 54/109 | 25/72 | 58/63 |

Referring to the data of Table XI, it is evident that the Desco ® system (run 2), i.e., 87.5 percent SMQ/12.5 percent DiCr, and the 1.9/1 SMQ/lignite/12.5 percent DiCr system (run 4) were comparable in thinning capacity and superior to the other systems in the table. It is noteworthy that the SMQ (run 1) and 1.9/1 SMQ/lignite formulation (run 3) were approximately comparable in thinning capacity (cf. 10 minute gel strengths). The remaining systems in the table (runs 5-9) were generally comparable in performance but less effective than the dichromate-containing formulations.

EXAMPLE X

This example presents data on thinning systems in an unweighted drilling mud wherein zinc oxide and magnesium oxide are used to replace dichromate. The thinner level was 1 lb/bbl in uncontaminated mud and 3 lb/bbl in mud contaminated with 2 lb/bbl NaCl. Results are summarized in Table XII.

system (run 2), the base mud (run 1) or the 1.9/1 SMQ/lignite system (run 6), resulted in higher yield points and higher 10 minute gel strengths.

Referring to the contaminated mud results in Table XII, it is evident that the performance of the chromium-containing Desco ® system (run 3) (87.5 percent SMQ/12.5 percent DiCr) was even more superior to the other systems than had been observed in the uncontaminated mud, especially after aging for 16 hours @ 80° C. In general, the zinc oxide (run 4) and magnesium oxide (run 5) additives improved the thinning performance of SMQ (run 2). A similar conclusion can be drawn based on the performance of the 1.9/1 SMQ/lignite systems (runs 6, 7, 8, 9). The metal additives improved the general thinning capability (see thermal aging results) of the 1.9/1 SMQ/lignite material. The dichromate system (run 7) was inferior to the zinc oxide system (run 8) which in turn was superior to the magnesium oxide system (run 9) based primarily on 10 minute gel strength

TABLE XII

ZnO and MgO Replacement for Dichromate in SMQ and SMQ/Lignite Based Mud Thinners

| Run No. | Additive | Uncontaminated Mud[a] | | | | | NaCl Contaminated Mud[b] | | | |
|---|---|---|---|---|---|---|---|---|---|---|
| | | Initial | | 16 Hrs. Aged @ 80° C. | | Water Loss | Initial | | 16 Hrs Aged @ 80° C. | |
| | | PV/YP | Gels | PV/YP | Gels | | PV/YP | Gels | PV/YP | Gels |
| 1 | Base Mud* (Control) | 21/24 | 7/44 | 25/32 | 15/57 | 6.3 | 25/32 | 15/57 | TTTM[c] | TTM[c] |
| 2 | SMQ (Control) | 25/25 | 17/54 | 26/27 | 14/51 | 7.1 | 20/38 | 36/55 | 28/110 | 80/97 |
| 3 | SMQ/DiCr (12.5%) | 20/23 | 13/50 | 26/19 | 2/14 | 6.7 | 24/22 | 12/43 | 34/30 | 7/40 |
| 4 | SMQ/ZnO (15%) | 21/23 | 13/54 | 23/23 | 7/35 | 6.3 | 23/22 | 9/51 | 23/50 | 36/80 |
| 5 | SMQ/MgO (15%) | 23/29 | 27/68 | 24/28 | 14/46 | 6.6 | 24/12 | 2/14 | 24/69 | 55/102 |
| 6 | 1.9/1 SMQ/ Lignite | 21/25 | 13/50 | 24/29 | 18/51 | 6.7 | 22/27 | 20/54 | 29/121 | 91/112 |
| 7 | 1.9/1 SMQ/ Lignite (12.5%) DiCr | 21/27 | 19/53 | 27/22 | 3/17 | 6.6 | 25/23 | 6/43 | 69/112 | 48/104 |
| 8 | 1.9/1 SMQ/ Lignite ZnO (15%) | 23/25 | 12/58 | 26/27 | 11/47 | 6.2 | 24/25 | 7/60 | 28/42 | 29/90 |
| 9 | 1.9/1 SMQ/ Lignite MgO (15%) | 21/28 | 15/59 | 26/28 | 13/50 | 6.7 | 27/14 | 2/8 | 32/65 | 62/115 |

*Unweighted mud (no pH adjustment): 3947 g P95 clay, 789 g bentonite and 16813 mL deionized water.
[a]Thinner level was 1 lb/bbl.
[b]Thinner level was 3 lb/bbl; NaCl level was 2 lb/bbl.
[c]TTTM represents "Too Thick to Measure".

Referring to the data in Table XII, it is apparent that in general for the uncontaminated mud, the chromium-containing systems (runs 3, 7) exhibited slightly lower yield points and 10 minute gel strengths than did the zinc oxide system (runs 4, 8), which in turn was a slightly better thinner than the magnesium oxide system (runs 5, 9). The thermal aging for all metal-containing systems (runs 3, 4, 5, 7, 8, 9) improved thinning capacity whereas thermal aging (16 hours @ 80° C.) of the SMQ values after thermal aging.

EXAMPLE XI

This example presents data on runs carried out with a weighted synthetic sea water mud. This mud contained 3947 g P 95 clay, 789 g bentonite, 9452 g barite and 16813 mL synthetic sea water.

The synthetic sea water was prepared by adding 41.95 g of the following salt mixture to each liter of water:

| Component | Weight Percent |
|---|---|
| NaCl | 58.5 |
| $MgCl_2.6H_2O$ | 26.5 |
| $Na_2SO_4$ | 9.75 |
| $CaCl_2$ | 2.76 |
| KCl | 1.64 |
| $NaHCO_3$ | 0.47 |
| KBr | 0.24 |
| $H_3BO_3$ | 0.071 |
| $SrCl_2.6H_2O$ | 0.095 |
| NaF | 0.007 |

TABLE XIII

Thinners Containing Zinc Oxide, Magnesium Oxide, Iron Compounds and Dichromate in Synthetic Sea Water Mud

| Run No. | Additive | Wt. % Metal Compound | Initial Properties PV/YP | Gels | Properties After Aging 16 hrs @ 80° C. PV/YP | Gels | WL |
|---|---|---|---|---|---|---|---|
| 1 | Base Mud* (Control) | 0 | 4/186 | 90/81 | TTTM | TTTM | 31.5 |
| 2 | SMQ (Control) | 0 | 8/28 | 21/26 | 10/24 | 20/22 | 28.8 |
| 3 | SMQ/DiCr | 12.5 | 7/19 | 20/25 | 13/21 | 21/21 | 29.0 |
| 4 | SMQ/MgO | 15 | 11/30 | 21/32 | 8/29 | 21/24 | 31/6 |
| 5 | SMQ/ZnO | 15 | 9/25 | 22/25 | 11/27 | 20/24 | 29.6 |
| 6 | $SMQ/Fe_2(SO_4)_3.xH_2O$ | 25 | 14/27 | 24/27 | 11/27 | 21/23 | |
| 7 | $SMQ/FeSO_4.7H_2O$ | 25 | 10/22 | 19/22 | 10/22 | 18/21 | 30.8 |
| 8 | $SMQ/FeCl_2.4H_2O$ | 25 | 8/26 | 24/22 | 8/28 | 20/23 | |
| 9 | $SMQ/SrCO_3$ | 15 | 11/30 | 21/24 | 10/32 | 23/27 | |
| 10 | 1.9/1 SMQ/Lignite | 0 | 9/45 | 28/31 | 6/29 | 29/32 | |
| 11 | 1.9/1 SMQ/Lignite DiCr | 12.5 | 11/74 | 45/52 | 8/67 | 67/57 | |
| 12 | 1.9/1 SMQ/Lignite MgO | 15 | 12/62 | 39/41 | 11/43 | 43/40 | 32.3 |
| 13 | 1.9/1 SMQ/Lignite ZnO | 15 | 7/50 | 31/35 | 6/27 | 27/33 | |

*Weighted synthetic sea water mud.

Referring to the results in Table XVI, it is evident that the SMQ (87.5 percent)/DiCr (12.5 percent) (Desco ®) system (run 3) was comparable to SMQ (run 2) for thinning capacity in this synthetic sea water mud (see yield points and 10 minute gel strengths). The zinc and iron systems with SMQ (runs 5, 6, 7, 8) were just slightly inferior to the Desco ® (run 3) or SMQ alone systems (run 2) in thinning performance (see yield points and 10 minute gel strengths). The magnesium (run 4) and strontium (run 9) systems were somewhat less effective than the zinc and iron systems.

Referring to the 1.9/1 SMQ/lignite systems (runs 10, 11, 12, 13) in the table, it is apparent that the addition of zinc oxide (run 13) and magnesium oxide (run 12) enhanced the thinning capacity more than did the addition of dichromate (run 11). The dichromate (run 11) and magnesium oxide (run 12) systems were less effective thinners (higher yield points and higher 10 minute gel strengths) than was the 1.9/1 SMQ/lignite blend (run 10). The zinc oxide system (run 13) was comparable to said blend. In the systems examined, the water loss control entries in the table are comparable.

EXAMPLE XII

This example presents data on runs carried out in a typical fresh water field mud. This mud had a density of 8.95 lb/gal with a chloride level of 500 ppm and 20 ppm hardness. The effectiveness of various thinners was examined in the uncontaminated mud and mud contaminated with either 1 lb/bbl gypsum or 3 lb/bbl NaCl. Results are summarized in Table XIV.

TABLE XIV

SMQ Thinners Containing Dichromate, Zinc Oxide or Magnesium Oxide in a Fresh Water Field Mud

| Run No. | Additive | Aged 16 hrs. @ 80° C. Uncontaminated Mud$^a$ PV/YP | Gels | Aged 16 hrs. @ 80° C. NaCl Contaminated Mud* PV/YP | Gels | Aged 16 hrs. @ 16 hrs. Gypsum Contaminated Mud* PV/YP | Gels |
|---|---|---|---|---|---|---|---|
| 1 | Base Mud (Control) | 24/13 | 5/40 | — | — | 25/17 | 5/33 |
| 2 | SMQ | 27/7 | 1/5 | — | — | 28/6 | 2/9 |
| 3 | (Control) | 23/9 | 2/7 | 19/33 | 26/98 | — | — |
| 4 | SMQ/DiCr | 29/6 | 1/2 | — | — | 32/1 | 1/2 |
| 5 | (12.5%) | 28/8 | 1/2 | 23/16 | 3/26 | — | — |
| 6 | SMQ/ZnO | 22/8 | 1/3 | — | — | 34/5 | 2/5 |
| 7 | (15%) | 26/6 | 1/2 | 25/19 | 8/42 | — | — |
| 8 | SMQ/MgO | 28/8 | 2/4 | — | — | 30/14 | 2/13 |

TABLE XIV-continued

| | | SMQ Thinners Containing Dichromate, Zinc Oxide or Magnesium Oxide in a Fresh Water Field Mud | | | | | |
|---|---|---|---|---|---|---|---|
| | | Aged 16 hrs. @ 80° C. Uncontaminated Mud[a] | | Aged 16 hrs. @ 80° C. NaCl Contaminated Mud* | | Aged 16 hrs. @ 16 hrs. Gypsum Contaminated Mud* | |
| Run No. | Additive | PV/YP | Gels | PV/YP | Gels | PV/YP | Gels |
| 9 | (15%) | 30/6 | 2/3 | 25/19 | 12/52 | — | — |

[a]Thinner level was 1 lb/bbl (runs 2,4,6,8) or 2 lb/bbl (runs 3,5,7,9).
*NaCl contamination was 3 lb/bbl and thinner level was 2 lb/bbl; gypsum contamination was 1 lb/bbl and thinner level was 1 lb/bbl.

Referring to the uncontaminated mud results in Table XIV, it is apparent (see runs 4, 5), that the Desco ® system SMQ (87.5 percent)/DiCr (12.5 percent), is comparable in thinning capacity to the systems 85 percent SMQ/15 percent ZnO (runs 6, 7) and 85 percent SMQ/15 percent MgO (runs 8, 9) which in turn have generally lower yield points and 10 minute gel strengths than the base mud (run 1) and the use of SMQ alone (runs 2, 3).

Referring to the NaCl contaminated mud results in Table XIV, it is evident that the 85 percent SMQ/15 percent ZnO (runs 6, 7) and 85 percent SMQ/15 percent MgO (runs, 8, 9) systems were superior to SMQ alone (runs 2, 3) but slightly less effective than the Desco ® system (runs 4, 5). In the gypsum contaminated mud, the Desco ® system (runs 4, 5) was clearly superior and the SMQ alone system (runs 2, 3) was somewhat more effective than the 85 percent SMQ/15 percent ZnO (runs 6, 7) and 85 percent SMQ/15 percent MgO systems (runs 8, 9).

EXAMPLE XIII

This example presents results on the inventive 87.5 percent (1.9/1 SMQ/lignite)/12.5 percent DiCr; 85 percent (1.9/1 SMQ/lignite)/15 percent ZnO and 85 percent (1.9/1 SMQ/lignite)/15 percent MgO systems in a weighted synthetic sea water mud.

Referring to the results in Table XV, it is apparent (run 1), that the 1.9/1 SMQ/lignite blend alone was the most effective thinner in the synthetic sea water mud and its performance was diminished the most by the addition of dichromate (run 2) and progressively less by the addition of MgO (run 3) or ZnO (run 4). These results indicate the potential usefulness of the 1.9/1 SMQ/lignite blend (run 1) with no added metal compound or with added ZnO (run 4) in the weighted synthetic sea water mud.

EXAMPLE XIV

This example presents data on the thinning performance of SMQ/causticized lignite blends prepared by physically mixing SMQ individually with two different commercial causticized lignite samples (3.5 parts by weight SMQ and 3.5 parts by weight causticized lignite). These blends were formulated with sufficient sodium dichromate dihydrate (1 part by weight) to give 87.5 percent (SMQ/causticized lignite)/12.5 percent DiCr compositions for thinning a fresh water drilling mud. Other thinners tested in this series were 87.5 percent SMQ/12.5 percent DiCr (Desco ®) and 87.5 percent (1.9/1 SMQ/lignite)/12.5 percent DiCr (prepared in the slurry process procedure described hereinbefore.) Mud test results are summarized in Table XVI.

TABLE XV

| | | SMQ/Lignite Blends with Dichromate, Zinc Oxide and Magnesium Oxide in a Weighted Synthetic Sea Water Mud | | | | | |
|---|---|---|---|---|---|---|---|
| Run No. | Blend[a] | Wt % Metal Compound | Unaged Results | | Aged 16 Hrs @ 80° C. | | Water Loss |
| | | | PV/YP | Gels | PV/YP | Gels | |
| 1 | 1.9/1 SMQ/Lignite | 0 | 9/45 | 28/31 | 6/29 | 29/32 | |
| 2 | 1.9/1 SMQ/Lignite | 12.5 (DiCr) | 11/74 | 45/52 | 8/67 | 67/57 | |
| 3 | 1.9/1 SMQ/Lignite | 15 (MgO) | 12/62 | 39/41 | 11/43 | 43/40 | 32.3 |
| 4 | 1.9/1 SMQ/Lignite | 15 (ZnO) | 7/50 | 31/35 | 6/27 | 27/33 | |

[a]Thinner level was 3 lb/bbl.
*Synthetic sea water mud contained 3947 g P95 clay, 789 g bentonite, 9452 g barite in 16813 mL synthetic sea water.

TABLE XVI

| | | Physical Blends of SMQ/Causticized Lignite With Added Na$_2$Cr$_2$O$_7$.2H$_2$O as Mud Thinners (Fresh Water Mud) | | | | | | | |
|---|---|---|---|---|---|---|---|---|---|
| Run No. | Thinner | Wt % DiCr | Unaged Results | | Aged 16 Hrs. @ 176 F | | Water Loss | Aged 16 Hrs. @ 300 F | |
| | | | PV/YP | Gels | PV/YP | Gels | | PV/YP | Gels |
| (a) 0.5 ppb Thinner | | | | | | | | | |
| 1 | SMQ/DiCr | 12.5 | 24/11 | 2/27 | 28/10 | 2/4 | 7.2 | NM* | NM* |
| 2 | 1.9/1 SMQ/Lignite** (DiCr) | 12.5 | 25/10 | 2/23 | 29/10 | 2/3 | 7.0 | NM* | NM* |

TABLE XVI-continued

Physical Blends of SMQ/Causticized Lignite With Added
$Na_2Cr_2O_7.2H_2O$ as Mud Thinners (Fresh Water Mud)

| Run No. | Thinner | Wt % DiCr | Unaged Results PV/YP | Unaged Results Gels | Aged 16 Hrs. @ 176 F PV/YP | Aged 16 Hrs. @ 176 F Gels | Water Loss | Aged 16 Hrs. @ 300 F PV/YP | Aged 16 Hrs. @ 300 F Gels |
|---|---|---|---|---|---|---|---|---|---|
| 3 | 1/1 SMQ/ CL[a] (DiCr) | 12.5 | 24/8 | 2/29 | 27/9 | 1/3 | 7.6 | NM* | NM* |
| 4 | 1/1 SMQ/ CL[b] (DiCr) | 12.5 | 27/10 | 1/29 | 28/11 | 2/4 | 7.9 | NM* | NM* |
| 5 | 1/1 SMQ/ CL[c] (DiCr) | 12.5 | 26/9 | 2/26 | 30/10 | 1/4 | 7.4 | NM* | NM* |
| 6 | CL (DiCr) | 12.5 | 24/16 | 6/52 | 29/10 | 2/16 | 7.6 | NM* | NM* |
| 7 | Base Mud | 0 | 23/20 | 4/46 | 28/20 | 5/23 | 7.8 | 42/34 | 21/69 |
| (b) 1.0 ppb Thinner | | | | | | | | | |
| 8 | SMQ/ (DiCr) | 12.5 | 23/9 | 2/29 | 29/4 | 1/2 | 6.5 | 30/18 | 4/29 |
| 9 | 1.9/1 SMQ/Lignite (DiCr) | 12.5 | 25/12 | 2/37 | 30/5 | 1/2 | 6.9 | 31/19 | 4/27 |
| 10 | 1/1 SMQ/ CL (DiCr) | 12.5 | 23/11 | 2/40 | 27/7 | 1/2 | 7.2 | 33/20 | 6/31 |
| 11 | 1/1 SMQ/ CL (DiCr) | 12.5 | 24/10 | 2/32 | 28/7 | 1/3 | 7.4 | 33/20 | 8/35 |
| 12 | 1/1 SMQ/ CL (DiCr) | 12.5 | 26/10 | 1/35 | 29/7 | 0/2 | 7.2 | 32/21 | 6/32 |
| 13 | CL (DiCr) | 12.5 | 24/13 | 6/52 | 27/11 | 1/15 | 7.8 | NM* | NM* |

*NM represents "Not Measured".
**Tannathin ® lignite was used in the slurry process.
[a]Causticized lignite (CL) was obtained from Georesources.
[b]Causticized lignite (CL) was obtained from American Colloid (Regular Treat).
[c]Causticized lignite (CL) was obtained from American Colloid (Extra Fine Treat).

Referring to the results in Table XVI, it is evident that all of the SMQ/lignite compositions (runs 2, 3, 4, 5, 9, 10, 11, 12) were effective thinners as shown by the lower yield points and 10 minute gel strengths compared to values for the base mud (run 7). It is also noteworthy that the thinning capacity of the SMQ/lignite/-DiCr systems (runs 2, 3, 4, 5, 9, 10, 11, 12) was comparable to the thinning capacity of the Desco ® system (runs 1, 8). No dramatic performance differences were noted in the systems containing a variety of causticized lignite samples (runs 3, 4, 5, 10, 11, 12). A mixture of causticized lignite and DiCr (Runs 6, 13) was not as effective a thinning agent as any of the SMQ/lignite/-DiCr systems (runs 2, 3, 4, 5, 9, 10, 11, 12).

All of the water loss values in Table XVI are comparable. In view of the overall balance of water loss, yield points and gel strengths, it appears that the slurry process material (runs 2, 9); the physically blended materials (runs 3, 4, 5, 10, 11, 12) and Desco ® (runs 1, 8) are comparable in thinning a P95B5 fresh water mud.

EXAMPLE XV

This example presents data on the thinning performance of SMQ/causticized lignite blends prepared by physically mixing SMQ and causticized lignite from two different commercial suppliers. These blends were also used in the previous example in a fresh water mud. In this example, the thinning effectiveness of these compositions was determined after aging 16 hours at 176F in uncontaminated and contaminated muds. Thinners were used at a level of 4 ppb and the results are summarized in Table XVII.

TABLE XVII

Physical Blends of SMQ/Causticized Lignite With
Added $Na_2Cr_2O_7.2H_2O$ as Mud Thinners (Thermally Aged)

| Run No. | Thinner | Wt % DiCr | Uncontaminated Mud PV/YP | Uncontaminated Mud Gels | NaCl[d] Contaminated Mud PV/YP | NaCl[d] Contaminated Mud Gels | NaCl[d] Contaminated Mud Water Loss | Gypsum[e] Contaminated Mud PV/YP | Gypsum[e] Contaminated Mud Gels | Gypsum[e] Contaminated Mud Water Loss |
|---|---|---|---|---|---|---|---|---|---|---|
| 1 | SMQ/DiCr | 12.5 | 27/2 | 0/1 | 31/6 | 1/4 | 6.8 | 35/13 | 2/12 | 6.8 |
| 2 | 1.9/1 SMQ/ Lignite** (DiCr) | 12.5 | 27/5 | 1/2 | 31/10 | 2/5 | 6.7 | 39/13 | 2/10 | 6.3 |
| 3 | 1/1 SMQ/CL[a] (DiCr) | 12.5 | 25/3 | 1/2 | 30/5 | 1/5 | 7.0 | 35/11 | 2/11 | 7.4 |
| 4 | 1/1 SMQ/CL[b] (DiCr) | 12.5 | 28/3 | 1/1 | 31/8 | 1/4 | 6.7 | 36/11 | 2/8 | 7.1 |
| 5 | 1/1 SMQ/CL[c] | 12.5 | 29/2 | 1/1 | 31/7 | 1/5 | 7.1 | 35/11 | 2/9 | 7.3 |

TABLE XVII-continued

Physical Blends of SMQ/Causticized Lignite With Added $Na_2Cr_2O_7.2H_2O$ as Mud Thinners (Thermally Aged)

| Run No. | Thinner | Wt % DiCr | Uncontaminated Mud | | NaCl[d] Contaminated Mud | | | Gypsum[e] Contaminated Mud | | |
|---|---|---|---|---|---|---|---|---|---|---|
| | | | PV/YP | Gels | PV/YP | Gels | Water Loss | PV/YP | Gels | Water Loss |
| 6 | (DiCr) Base Mud | 0 | 30/18 | 3/19 | 19/132 | 132/145 | 8.9 | 11/152 | 106/156 | 13.6 |

See footnote  in Table XVI.
[a]See footnote a in Table XVI.
[b]See footnote b in Table XVI.
[c]See footnote c in TABLE XVI.
[d]Fresh water mud was contaminated with 2 ppb NaCl.
[e]Fresh water mud was contaminated with 2 ppb $CaSO_4.2H_2O$.

Referring to the yield point and 10 minute gel strength values in Table XVII, it is evident that all of the SMQ/lignite and SMQ/causticized lignite compositions (runs 2, 3, 4, 5) were effective for thinning the base mud (run 6). It is also noteworthy that the thinning capacity of the lignite and causticized lignite systems (runs 2, 3, 4, 5) was comparable to the thinning capacity of the Desco ® system (run 1). No dramatic difference in performance was noted in the systems containing a variety of causticized lignite samples (runs 3, 4, 5). All of the thinning systems showed lower water loss values (runs 1, 2, 3, 4, 5) than was observed in the base mud (run 6).

In view of the overall balance of water loss control, yield points and gel strengths, it is evident that the slurry process material (run 2); the physically blended materials (runs 3, 4, 5) and Desco ® (run 1) are comparable in thinning capacity based on performance in thermally aged uncontaminated and contaminated muds.

The above examples, while in the form of tests, show the comparative efficiencies of the various additive agents enumerated, thereby enabling those skilled in the art to employ these agents in those cases where the consistency of a drilling fluid is to be controlled as to viscosity, gel strength, etc. In the treatment of a drilling fluid in accordance with modern practice, such agents are not employed haphazard, but a preliminary test is made at the well to determine the effectiveness of an agent and the percentages to be employed. The driller will then be guided during the course of drilling to add such amounts of the agents as are necessary.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A drilling fluid additive mixture consisting essentially of a sulfoalkylated tannin in admixture with a non-sulfoalkylated alkali-solubilized lignite wherein the weight ratio of the sulfoalkylated tannin to said non-sulfoalkylated lignite is in the range from about 2:1 to about 1:1, wherein the sulfoalkylated tannin has been sulfoalkylated with at least one —$C(R)_2$—$SO_3M$ side chain, wherein each R is selected from the group consisting of hydrogen and alkyl radicals containing from 1 to about 5 carbon atoms, and M is selected from the group consisting of ammonium and the alkali metals.

2. A composition in accordance with claim 1 wherein said non-sulfoalkylated lignite is a Leonardite.

3. A composition in accordance with claim 1 wherein said sulfoalkylated tannin is sulfomethylated quebracho.

4. A composition in accordance with claim 1 wherein said mixture of said sulfoalkylated tannin and said non-sulfoalkylated lignite is a dry mixture.

5. A composition in accordance with claim 1, characterized further as additionally consisting essentially of a component containing at least one metal selected from the group consisting of chromium, titanium, iron, zinc, strontium and magnesium in a form which is at least partially water soluble.

6. A composition in accordance with claim 5 wherein said component containing at least one metal is selected from the group consisting of zinc oxide, zinc carbonate, magnesium oxide, ferrous sulfate heptahydrate ($FeSO_4.7H_2O$), ferric sulfate, $Fe_2(SO_4)_3.xH_2O$; ferric oxide ($Fe_2O_3$), ferrous chloride ($FeCl_2.4H_2O$), titanium dioxide or strontium carbonate.

7. A composition in accordance with claim 5 wherein the component containing at least one metal contains chromium.

8. A composition in accordance with claim 5 wherein the combined weight of the sulfoalkylated tannin and lignite to the weight of metal in the component containing at least one metal is in the range from about 100:1 to about 1:1.

9. A method of preparing a composition useful as a drilling fluid additive, consisting essentially of the steps of:

(a) preparing a sulfoalkylated tannin solution wherein the sulfoalkylated tannin has been sulfoalkylated with at least one —$C(R)_2$—$SO_3M$ side chain, wherein each R is selected from the group consisting of hydrogen and alkyl radicals containing from 1 to about 5 carbon atoms, and M is selected from the group consisting of ammonium and the alkali metals;

(b) adding non-sulfoalkylated alkali-solubilized lignite to the solution to form a mixture wherein the weight ratio of said sulfoalkylated tannin to said non-sulfoalkylated lignite is in the range from about 2:1 to about 1:1; and (c) drying the resulting mixture.

10. A method in accordance with claim 9 characterized further as additionally including the step of incorporating a metal selected from the group consisting of chromium, titanium, iron, zinc, strontium and magnesium in an at least partially water soluble form.

11. A method of preparing a composition useful as a drilling fluid additive, consisting essentially of the steps of:

(a) preparing a sulfoalkylated tannin wherein the sulfoalkylated tannin is sulfoalkylated with at least one —C(R)$_2$—SO$_3$M side chain, wherein each R is selected from the group consisting of hydrogen and alkyl radicals containing from 1 to about 5 carbon atoms, and M is selected from the group consisting of ammonium and the alkali metals;

(b) drying said sulfoalkylated tannin; and (c) dry blending said sulfoalkylated tannin with a non-sulfoalkylated alkali-solubilized lignite to form a mixture blend wherein the weight ratio of said sulfoalkylated tannin to said non-sulfoalkylated lignite is in the range from about 2:1 to about 1:1.

12. A method in accordance with claim 11, characterized further as additionally including the step of incorporating a metal selected from the group consisting of chromium, titanium, iron, zinc, strontium and magnesium together with said mixture blend, wherein the metal is in an at least partially water soluble form.

13. In a process for the drilling of a well with well drilling tools wherein a drilling fluid is circulated in said well in contact with the wall thereof, the improvement comprising circulating in said well as said drilling fluid an aqueous drilling fluid which contains an additive which consists essentially of a sulfoalkylated tannin component and a non-sulfoalkylated alkali-solubilized lignite; wherein the weight ratio of said sulfoalkylated tannin to said non-sulfoalkylated lignite is in the range from about 2:1 to about 1:1, wherein the sulfoalkylation is with at least one —C(R)$_2$—SO$_3$M side chain, wherein each R is selected from the group consisting of hydrogen and alkyl radicals containing from 1 to about 5 carbon atoms, and M is selected from the group consisting of ammonium and the alkali metals; wherein the total amount of said additive added to said drilling fluid is effective to reduce at least one of (a) the plastic viscosity,
(b) the yield point,
(c) the shear strength,
(d) the water loss due to filtration and
(e) the 10-minute gel strength of said drilling fluid.

14. A process in accordance with claim 13 wherein said additive is characterized further as additionally consisting essentially of a metal component selected from the group consisting of chromium, titanium, iron, zinc, strontium and magnesium in a form which is at least partially soluble in water; wherein the total amount of said composition added to said drilling fluid is effective to reduce at least one of (a) the plastic viscosity,
(b) the yield point,
(c) the shear strength,
(d) the water loss due to filtration and
(e) the 10-minute gel strength of said drilling fluid.

15. A drilling fluid additive consisting essentially of a mixture of a sulfoalkylated vegetable tannin and a non-sulfoalkylated alkali-solubilized lignite, wherein the weight ratio of said tannin to said lignite is about 2:1, wherein the sulfoalkylated tannin has been sulfoalkylated with at least one —C(R)$_2$—SO$_3$M side chain, wherein each R is selected from the group consisting of hydrogen and alkyl radicals containing from 1 to about 5 carbon atoms, and M is selected from the group consisting of ammonium and the alkali metals.

16. A composition in accordance with claim 15 wherein said nonsulfoalkylated alkali-solubilized lignite is Leonardite.

17. A composition in accordance with claim 15 wherein said sulfoalkylated tannin is sulfomethylated quebracho.

18. A composition in accordance with claim 15 wherein said mixture of said sulfoalkylated tannin and said non-sulfoalkylated alkali-solubilized lignate is a dry mixture.

19. A drilling fluid additive in accordance with claim 15 characterized further as additionally containing a component containing at least one metal compound selected from the group consisting of metal compounds of chromium, titanium, iron, zinc, strontium and magnesium and in a form which is at least partially water soluble.

20. A composition in accordance with claim 19 wherein said component containing at least one metal compound is selected from the group consisting of zinc oxide, zinc carbonate, magnesium oxide, ferrous sulfate heptahydrate, (FeSO$_4$.7H$_2$O), ferric sulfate, Fe$_2$(SO$_4$)$_3$.xH$_2$O; ferric oxide (Fe$_2$O$_3$), ferrous chloride (FeCl$_2$.4H$_2$O), titanium dioxide and strontium carbonate.

21. A composition in accordance with claim 19 wherein said component containing at least one metal compound contains chromium.

22. A composition in accordance with claim 19 wherein the combined weight of said sulfoalkylated tannin and non-sulfoalkylated alkali-solubilized lignite to the weight of said component containing at least one metal compound is in the range from about 100:1 to about 1:1.

23. A method of preparing a composition useful as a drilling fluid additive, consisting essentially of the steps of:

(a) preparing a sulfoalkylated vegetable tannin solution;

(b) adding non-sulfoalkylated alkali-solubilized lignite to the solution to form a mixture, wherein the weight ratio of said tannin to said lignite is about 2:1, wherein the sulfoalkylated tannin has been sulfoalkylated with at least one —C(R)$_2$—SO$_3$M side chain, wherein each R is selected from the group consisting of hydrogen and alkyl radicals containing from 1 to about 5 carbon atoms, and M is selected from the group consisting of ammonium and the alkali metals; and (c) drying the resulting mixture.

24. A method in accordance with claim 23 characterized further as additionally including the step of incorporating a metal selected from the group consisting of chromium, titanium, iron, zinc, strontium and magnesium in an at least partially water soluble form into the mixture.

25. A method of preparing a composition useful as a drilling fluid additive consisting essentially of the steps of:

(a) preparing a sulfoalkylated vegetable tannin;

(b) drying said sulfoalkylated vegetable tannin; and (c) dry blending said sulfoalkylated vegetable tannin with a non-sulfoalkylated alkali-solubilized lignite to form a mixture blend, wherein the weight ratio of said tannin to said lignite in said mixture is about 2:1, wherein the sulfoalkylated tannin has been sulfoalkylated with at least one —C(R)$_2$—SO$_3$M side chain, wherein each R is selected from the group consisting of hydrogen and alkyl radicals containing from 1 to about 5 carbon atoms, and M is selected from the group consisting of ammonium and the alkali metals.

26. A method in accordance with claim 25 characterized further as additionally consisting essentially of the step of incorporating a metal selected from the group consisting of chromium, titanium, iron, zinc, strontium and magnesium into said mixture blend, wherein the metal is in an at least partially water soluble form.

27. In a process for the drilling of a well with well drilling tools wherein a drilling fluid is circulated in said well in contact with the wall thereof, the improvement comprising circulating in said well as said drilling fluid an aqueous drilling fluid which contains an additive which consists essentially of a sulfoalkylated vegetable tannin component, and a non-sulfoalkylated alkali-solubilized lignite component, wherein the ratio of said tannin to said lignite is about 2:1, wherein the sulfoalkylated tannin has been sulfoalkylated with at least one $-C(R)_2-SO_3M$ side chain, wherein each R is selected from the group consisting of hydrogen and alkyl radicals containing from 1 to about 5 carbon atos, and M is selected from the group consisting of ammonium and the alkali metals; wherein the total amount of said composition added to said drilling fluid is effective to reduce at least one of
  (a) the plastic viscosity,
  (b) the yield point,
  (c) the shear strength,
  (d) the water loss due to filtration, and
  (e) the 10-minute gel strength of said drilling fluid.

28. A process in accordance with claim 27 wherein said additive is further characterized as additionally consisting essentially of a metal selected from the group consisting of chromium, titanium, iron, zinc, strontium and magnesium in a form which is at least partially water soluble; wherein the total amount of said composition added to said drilling fluid is effective to reduce at least one of
  (a) the plastic viscosity,
  (b) the yield point,
  (c) the shear strength,
  (d) the water loss due to filtration, and
  (e) the 10-minute gel strength of said drilling fluid.

* * * * *